US008044155B2

(12) United States Patent
Severn et al.

(10) Patent No.: US 8,044,155 B2
(45) Date of Patent: Oct. 25, 2011

(54) TITANOCENE-BASED CATALYST SYSTEM

(75) Inventors: John Richard Severn, Eindhoven (NL); John Clement Chadwick, Eindhoven (NL)

(73) Assignee: Stichting Dutch Polymer Institute, Eindhoven (NL)

( * ) Notice: Subject to any disclaimer, the term of this patent is extended or adjusted under 35 U.S.C. 154(b) by 0 days.

(21) Appl. No.: 12/113,601

(22) Filed: May 1, 2008

(65) Prior Publication Data
US 2008/0234452 A1 Sep. 25, 2008

Related U.S. Application Data

(63) Continuation of application No. 10/589,590, filed as application No. PCT/EP2005/001537 on Feb. 14, 2005, now abandoned.

(30) Foreign Application Priority Data

Feb. 16, 2004 (EP) .................... 04075463
Feb. 24, 2004 (EP) .................... 04075578

(51) Int. Cl.
C08F 4/6592 (2006.01)
C08F 4/646 (2006.01)
B01J 31/22 (2006.01)

(52) U.S. Cl. .............. 526/124.2; 502/103; 502/132; 502/134; 502/152; 502/156; 526/124.9; 526/160; 526/165; 526/348; 526/943

(58) Field of Classification Search ................ 502/103, 502/132, 152, 156, 134; 526/160, 165, 348, 526/943, 124.2, 124.9
See application file for complete search history.

(56) References Cited

U.S. PATENT DOCUMENTS

| 4,399,054 A | 8/1983 | Ferraris et al. |
| 5,145,819 A | 9/1992 | Winter et al. |
| 5,239,022 A | 8/1993 | Winter et al. |
| 5,243,001 A | 9/1993 | Winter et al. |
| 5,324,800 A | 6/1994 | Welborn, Jr. et al. |
| 5,556,928 A | 9/1996 | Devore et al. |
| 5,698,487 A | 12/1997 | Sacchetti et al. |
| 6,500,975 B1 | 12/2002 | Schwab et al. |

FOREIGN PATENT DOCUMENTS

| EP | 129368 | 12/1985 |
| EP | 395086 | 10/1990 |
| EP | 416815 | 3/1991 |
| EP | 420436 | 4/1991 |
| EP | 485820 | 5/1992 |
| EP | 485822 | 5/1992 |
| EP | 485823 | 5/1992 |
| EP | 553806 | 8/1993 |
| EP | 576213 | 12/1993 |
| EP | 643066 | 3/1995 |
| EP | 671404 | 9/1995 |
| JP | 63168408 | 11/1994 |
| WO | 91/04257 | 4/1991 |
| WO | 96/22995 | 8/1996 |
| WO | 98/22486 | 5/1998 |
| WO | 99/24446 | 5/1999 |
| WO | 99/58538 | 11/1999 |
| WO | 01/44318 | 6/2001 |
| WO | 01/47939 | 7/2001 |
| WO | 02/070569 | 9/2002 |
| WO | 03/045964 | 6/2003 |

OTHER PUBLICATIONS

F.R.W.P. Wild et al, ansa-Metallocene Derivatives-IV.*Synthesis adn Molecular Structures of Chiral ansa-Titanocene Derivatives with Bridged Tetrahydroindenl Ligands, Journal of Organometallic Chemistry, vol. 232, pp. 233-247 (1982).
A. Cardoso et al, "Reactions of Trimethylsilycyclopentadiene Derivatives with Titanium, Niobium, and Tantalum Halides," J. Chem. Soc., Dalton Trans., vol. 7, pp. 1156-1160 (1980).
D.W. Stephan et al., "An Approach to Catalyst Design: Cyclopentadienyl-Titanium Phosphinimide Complexes in Ethylene Polymerization," Organometallics, vol. 22, pp. 1937-1947 (2003).
J. Sassmannshausen et al, "Half-sandwich complexes of titanium and zirconium with pendant phenyl substituents. The influence of ansa-aryl coordination on the polymerisation activity of half-sandwich catalysts," Journal of Organometallic Chemistry, vol. 592, pp. 84-94 (1999).
H. Seock Cho et al., Polymerization of Ethylene and Ethylene/1-Hexene over Ziegler-Natta/Metallocene Hybrid Catalysts Supported on MgC12 Prepared by a Recrystallation Method, Journal of Applied Science, vol. 70, pp. 1707-1715 (1998).
Y.Gwan Ko et al, "The Characteristics of Metallocene/Ziegler-Natta Hybrid Catalysts Supported on the Recrystallation MgC12," Korean J. Chem. Eng., vol. 16(5), pp. 562-570 (1999).
H. Seock Cho et al, "Preparation of Inorganic MgC2-Alcohol Adduct and Its Application in Organometallic Hybrid Catalysts for Ethylene Polymerization," Korean J. Chem. Eng., vol. 19(4), pp. 557-563 (2002).
G. Satyanarayana et al, "An Unusually Stable Supported Bis(cyclopentadienyl)titanium Dichloride-Trialkylalminum Catalyst System for Ethylene Polymerization," Macromolecules, vol. 26(17), pp. 4712-4714 (1993).
H. Seock Cho et al, "Synthesis of inorganic MgCl2-alcohol adduct via recrystallization method and its application in supported organometallic catalysts for the poloymerization of ethylene with 1-hexene," Journal of Molecular Catalysis A: Chemical 191, pp. 155-165 (2003).
K. Soga et al, "Copolymerization of olefins with SiO2-, A12O3- and MgCl2-supported metallocene catalysts activated by trialkylaluminiums," Macromol. Chem. Phys., vol. 195, pp. 1369-1379 (1994).
K. Tanaka et al, "Rheological Analysis of Surface Relaxation Process of Monodisperse Polystyrene Films," Macromolecules, vol. 33(20), pp. 7588-7593 (2000).

Primary Examiner — Caixia Lu
(74) Attorney, Agent, or Firm — Nixon & Vanderhye P.C.

(57) ABSTRACT

A catalyst system obtainable by the process comprising the steps of contacting an adduct of formula (I)

$$MgT_2 \cdot yAlQ_j(OR'')_{3-j} \qquad (I)$$

wherein T is chlorine, bromine, or iodine; R" is a linear or branched $C_1$-$C_{10}$ alkyl radical; y ranges from 1.00 to 0.05; and j ranges from 0.01 to 3.00; with at least one metallocene compound having titanium as central metal and at least one ligand having a cyclopentadienyl skeleton.

10 Claims, No Drawings

TITANOCENE-BASED CATALYST SYSTEM

This application is a continuation of commonly owned U.S. Application Ser. No. 10/589,590, filed on Aug. 16, 2006, now abandoned which is the national phase application under 35 USC §371 of PCT/EP2005/001537 filed Feb. 14, 2005 and claims the benefit of priority from EP 04075578.7 filed Feb. 24, 2004 and EP 04075463.2, filed Feb. 16, 2004, the entire content thereof being hereby expressly incorporated by reference in this application.

The present invention relates to a solid catalyst system comprising a metallocene containing titanium as central metal (titanocene) and a partially dealcoholated adduct of magnesium dihalide and alcohol.

The use of metallocene compounds and, in particular, titanocene compounds as catalyst components for the polymerization of olefins is well known in the art. They are usually used in conjunction with alumoxanes as cocatalysts. The catalyst systems comprising titanocene compounds and alumoxanes can be used supported on an inert support in order to control the morphology of the obtained polymer and to avoid fouling in the reactor, especially in a gas-phase or slur polymerization processes.

The drawback of the catalyst systems so obtained is that since alumoxanes need to be used in large excess with respect to titanocene compounds the resulting catalyst is very expensive. Therefore it is desirable to reduce or eliminate the use of alumoxanes.

Magnesium chloride is a well-known support for Ziegler-Natta based catalyst systems containing titanium halide. The use of this compound as a carrier for single-site catalysts could be very advantageous, in view of its chemical and structural simplicity, and to the possibility to finely control the porosity of this support and, therefore, to easily tune the porosity of the final catalyst system.

Several catalyst systems trying to solve the problem of the use of alumoxanes in a magnesium halide supported catalyst system have been proposed in the art.

For example in Macromol. Chem. Phys. 195, 1369-1379 (1984) $MgCl_2$ in combination with a zirconocene catalyst and trialkylaluminum is used. More recently, in Macromolecules 1993, 26, 4712 mixtures of $MgR_2$ and $AlR_2Cl$ (generating $MgCl_2$ and $AlR_3$) as cocatalyst components for olefin polymerization using various metallocenes have been used. In various papers, namely, Korean J. Chem. Eng. 16(5) 562-570, Journal of Applied Polymer science Vol 70, 1707-1715, Korean J. Chem. Eng. 19(4) 557-563 and J. Molec. Catal A 191, 2003, 155-165 Lee and co-workers, proposed a metallocene-based catalyst system in which alcohol and anhydrous $MgCl_2$ are reacted to form an adduct $MgCl_2$-alcohol. The adduct, further reacted with trialkylaluminum, is used for supporting zirconocene compounds. The obtained catalyst system can be used without a further addition of alumoxanes.

In all these documents only metallocene compounds in which the central metal is zirconium have been used, moreover the adduct $MgCl_2$ alcohol used is not dealcoholated and it is not characterized by particular values of porosity and surface area. As shown in the comparative tests of the present application the use of a dealcoholated adduct of magnesium halide and alcohol improves the activity of the titanium-based catalyst system. U.S. Pat. No. 5,698,487 relates to a magnesium halide having a surface area (BET) greater than 50 m²/g, porosity (BET) greater than 0.15 cm³/g and porosity (Hg) greater than 0.3 cm³/g. The adduct $MgCl_2$-alcohol having these features has been used in combination with trialkylaluminum or alumoxane for supporting metallocene compounds. In all the working examples the metallocene compound is combined with trialkylaluminum or alumoxane before contact with the above support. As shown in the comparative test of the present application when the titanocene is not prereacted with trialkylaluminum the polymerization activity of the resulting catalyst system is improved.

The object of the present invention is a catalyst system obtainable by the process comprising the following steps:

a) contacting
(i) a partially dealcoholated adduct of formula $MgT_2 \cdot wR'OH$ wherein T is chlorine, bromine, or iodine, preferably chlorine; R' is a linear or branched $C_1$-$C_{10}$ alkyl radical, preferably R' is a linear $C_1$-$C_{10}$ alkyl radical; more preferably R' is a methyl or an ethyl radical; w ranges from 3 to 0.1, preferably from 3 to 0.5; more preferably from 3 to 1 being also a non integer number; with (ii) an organo-aluminium compound of formula $H_eAlU_{3-e}$, or $H_eAl_2U_{6-e}$, wherein each U substituent, same or different, is a hydrogen atom, a halogen atom, or a hydrocarbon radical containing from 1 to 20 carbon atoms optionally containing silicon or germanium atoms; with the proviso that at least one U is different from halogen, and e ranges from 0 to 1, being also a non-integer number; preferably said hydrocarbon radicals are linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals optionally containing silicon or germanium atoms; preferably U is a linear or branched $C_1$-$C_{20}$-alkyl radical; more preferably U is an ethyl, a n-propyl, a iso propyl, a n-butyl, a iso-butyl, a tert-butyl, a hexyl or an octyl radical;

to obtain an adduct of formula (I)

$$MgT_2 \cdot yAlQ_j(OR'')_{3-j} \qquad (I)$$

wherein y ranges from 1.00 to 005;

Q has the same meaning of U hydrogen and halogen atoms being excluded;

R" has been described above and j ranges from 0.01 to 3.00, being also a non-integer number.

b) contacting the product obtained from step a) with at least one metallocene compound having titanium as central metal and at least one ligand having a cyclopentadienyl skeleton;

with the proviso that the metallocene compound of step b) is not previously treated with an organo-aluminium compound of formula $H_eAlU_{3-e}$ or $H_eAl_2U_{6-e}$, or with an alumoxane. In step a) the product obtained by combining the partially dealcoholated adduct of formula $MgT_2 \cdot wR'OH$ and organo-aluminium compound of formula $H_eAlU_{3-e}$ or $H_eAl_2U_{6-e}$ (ii) is an adduct of formula (I)

$$MgT_2 \cdot yAlQ_j(OR'')_{3-j} \qquad (I)$$

preferably in the compound of formula (I) y ranges from 0.50 to 0.10; more preferably it ranges from 0.40 to 0.10;

j preferably ranges from 2.50 to 2.00; more preferably it ranges from 2.50 to 2.20.

Preferably said adduct of formula (I) has a surface area (BET) higher than 30 m²/g; more preferably higher than 38 m²/g; even more preferably higher than 200 m²/g; but it can reach values higher than 300 m²/g.

A preferred class of metallocene compounds to be used in step b) belongs to the following formulas (II), (III), (IV) or (V)

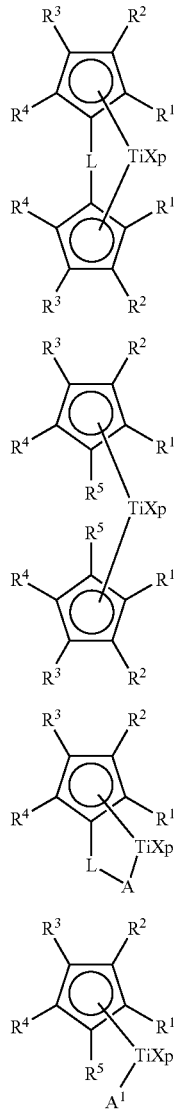

wherein
Ti is titanium;
the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a hydrocarbon radical containing from 1 to 20 carbon atoms optionally containing one or more Si or Ge atoms; preferably $R^6$ is a linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl optionally containing one or more Si or Ge atoms;
the substituents X are preferably the same and are preferably halogen, $R^6$, $OR^6$ and $NR^6_2$;
wherein $R^6$ is preferably a $C_1$-$C_7$ alkyl, $C_6$-$C_{14}$ aryl or $C_7$-$C_{14}$ arylalkyl group, optionally containing one or more Si or Ge atoms; more preferably, the substituents X are selected from the group consisting of —Cl, —Br, -Me, -Et, -n-Bu, -sec-Bu, -Ph, -Bz, —CH$_2$Sime$_3$, —OEt, —OPr, —OBu, —OBz and —NMe$_2$; more preferably X is Cl or Me.

p is an integer ranging from 1 to 2;
L is a divalent bridging group selected from $C_1$-$C_{20}$ alkylidene, $C_3$-$C_{20}$ cycloalkylidene, $C_6$-$C_{20}$ arylidene, $C_7$-$C_{20}$ alkylarylidene, or $C_7$-$C_{20}$ arylalkylidene radicals optionally containing heteroatoms belonging to groups 13-17 of the Periodic Table of the Elements, and silylidene radical containing up to 5 silicon atoms such as SiMe$_2$, SiPh$_2$; preferably L is a divalent group $(ZR^7_m)_n$; Z being C, Si, Ge, N or P, and the $R^7$ groups, equal to or different from each other, being hydrogen or hydrocarbon groups containing from 1 to 20 carbon atoms, or two $R^7$ can form a aliphatic or aromatic $C_4$-$C_7$ ring; preferably $R^7$ is hydrogen or a linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radical;
more preferably L is selected from Si(CH$_3$)$_2$, SiPh$_2$, SiPhMe, SiMe(SiMe$_3$), CH$_2$, (CH$_2$)$_2$, (CH$_2$)$_3$ or C(CH$_3$)$_2$;
m is 1 or 2, and more specifically it is 1 when Z is N or P, and it is 2 when Z is C, Si or Ge;
n is an integer ranging from 1 to 4; preferably it is 1 or 2;
each $R^1$, $R^2$, $R^3$, $R^4$ and $R^5$, equal to or different from each other, is a hydrogen atom, a $C_1$-$C_{40}$ hydrocarbon group optionally containing one or more heteroatoms belonging to groups 13-17 of the Periodic Table of the Elements; or two adjacent $R^1$, $R^2$, $R^3$, $R^4$ and $R^5$ form one or more 3-7 membered ring optional containing heteroatoms belonging to groups 13-17 of the periodic table; such as to form with the cyclopentadienyl moiety the following radicals: indenyl; mono-, di-, tri- and tetra-methyl indenyl; 2-methyl indenyl, 3-$^t$butyl-indenyl, 2-isopropyli-4-phenyl indenyl, 2-methyl-4-phenyl indenyl, 2-methyl-4,5 benzo indenyl; 3-trimethylsilyl-indenyl; 4,5,6,7-tetrahydroindenyl; fluorenyl, 5,10-dihydroindeno[1,2-b]indol-10-yl; N-methyl- or N-phenyl-5,10-dihydroindeno[1,2-b]indol-10-yl; 5,6-dihydroindeno[2,1-b]indol-6-yl; N-methyl- or N-phenyl-5,6-dihydroindeno[2,1-b]indol-6-yl; azapentalene-4-yl; thiapentalene-4-yl; azapentalene-6-yl; thiapentalene-6-yl; mono-, di- and tri-methyl-azapentalene-4-yl, 2,5-dimethyl-cyclopenta[1,2-b:4,3-b']-dithiophene;
preferably each $R^1$, $R^2$, $R^3$, $R^4$ and $R^5$ is a hydrogen atom or a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical, optionally containing one or more heteroatoms belonging to groups 13-17 of the Periodic Table of the Elements; or two adjacent $R^1$, $R^2$, $R^3$, $R^4$ and $R^5$ form one or more 3-7 membered ring optional containing heteroatoms belonging to groups 13-17 of the periodic table;
A is a NR$^8$, O, S radical, wherein $R^8$ is a $C_1$-$C_{20}$ hydrocarbon group optionally containing one or more heteroatoms belonging to groups 13-17 of the Periodic Table of the Elements;
preferably $R^8$ is a linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radical optionally containing one or more heteroatoms belonging to groups 13-17 of the Periodic Table of the Elements; more preferably $R^8$ is tert-butyl.
$A^1$ is a hydrogen atom, a halogen atom, $R^6$, $OR^6$, $OCOR^6$, $SR^6$, $R^6_2$ and $PR^6_2$, wherein $R^6$ is as described above; or $A^1$ is a NR$^9$ radical wherein $R^9$ is a $C_1$-$C_{40}$ hydrocarbon group optionally containing one or more heteroatoms belonging to groups 13-17 of the Periodic Table of the Elements;
Non limiting examples of compounds belonging to formulas (II), (III), (IV) and (V) are the following compounds (when possible in either their meso or racemic isomers, or mixtures thereof):
bis(cyclopentadienyl)titanium dichloride;
bis(indenyl)titanium dichloride;
bis(tetrahydroindenyl)titanium dichloride;
bis(fluorenyl)titanium dichloride;
(cyclopentadienyl)(indenyl)titanium dichloride;

(cyclopentadienyl)(fluorenyl)titanium dichloride;
(cyclopentadienyl)(tetrahydroindenyl)titanium dichloride;
(fluorenyl)(indenyl)titanium dichloride;
dimethylsilanediylbis(indenyl)titanium dichloride,
dimethylsilanediylbis(2-methyl-4-phenylindenyl)titanium dichloride,
dimethylsilanediylbis(4-naphthylindenyl)titanium dichloride,
dimethylsilanediylbis(2-methylindenyl)titanium dichloride,
dimethylsilanediylbis(2-methyl-4-t-butylindenyl)titanium dichloride,
dimethylsilanediylbis(2-methyl-4-isopropylindenyl)titanium dichloride,
dimethylsilanediylbis(2,4-dichlorideindenyl)titanium dichloride,
dimethylsilanediylbis(2-methyl-4,5-benzoindenyl)titanium dichloride,
dimethylsilanediylbis(2,4,7-trimethylindenyl)titanium dichloride,
dimethylsilanediylbis(2,4,6-trimethylindenyl)titanium dichloride,
dimethylsilanediylbis(2,5,6-trimethylindenyl)titanium dichloride,
methyl(phenyl)silanediylbis(2-methyl-4,6-diisopropylindenyl)-titanium dichloride,
methyl(phenyl)silanediylbis(2-methyl-4-isopropylindenyl)-titanium dichloride,
1,2-ethylenebis(indenyl)titanium dichloride,
1,2-ethylenebis(4,7-dichlorideindenyl)titanium dichloride,
1,2-ethylenebis(2-methyl-4-phenylindenyl)titanium dichloride,
1,4-butanediylbis(2-methyl-4-phenylindenyl)titanium dichloride,
1,2-ethylenebis(2-methyl-4,6-diisopropylindenyl)titanium dichloride,
1,4-butanediylbis(2-methyl-4-isopropylindenyl)titanium dichloride,
1,4-butanediylbis(2-methyl-4,5-benzoindenyl)titanium dichloride,
1,2-ethylenebis(2-methyl-4,5-benzoindenyl)titanium dichloride,
[4-($\eta^5$-cyclopentadienyl)-4,6,6-trimethyl($\eta^5$-4,5-tetrahydropentalene)]dichloridetitanium,
[4-$\eta^5$-3'-trimethylsilylcyclopentadienyl)-4,6,6-trimethyl($\eta^5$-4,5-tetrahydropentalene)]dichloridetitanium,
(tert-butylamido)(tetramethyl-$\eta^5$-cyclopentadienyl-1,2-ethane-dichloridetitanium,
(methylamido)(tetramethyl-$\eta^5$-cyclopentadienyl)dichloridesilyl-dichloridetitanium,
(methylamido)(tetramethyl-$\eta^5$-cyclopentadienyl)-1,2-ethanediyl-dichloridetitanium,
(tertbutylamido)-(2,4-dichloride-2,4-pentadien-1-yl)dimethylsilyl-dichloridetitanium,
bis(1,3-dichloridecyclopentadienyl)titanium dichloride,
methylene(3-methyl-cyclopentadienyl)-7-(2,5-dimethylcyclopentadienyl-[1,2-b:4,3-b']dithiophene)titanium dichloride;
methylene(3-isopropyl-cyclopentadienyl)-7-(2,5-dimethylcyclopentadienyl-[1,2-b:4,3-b']dithiophene)titanium dichloride;
methylene(2,4-dichloride-cyclopentadienyl)-7-(2,5-dimethylcyclopentadienyl-[1,2-b:4,3-b']dithiophene)titanium dichloride;
methylene(2,3,5-trimethyl-cyclopentadienyl)-7-(2,5-dimethylcyclopentadienyl-[1,2-b:4,3-b']dithiophene)titanium dichloride;
methylene-1-(indenyl)-7-(2,5-dimethylcyclopentadienyl-[1,2-b:4,3-b']dithiophene)titanium dichloride;
methylene-1-(indenyl)-7-(2,5-ditrimethylsilylcyclopentadienyl-[1,2-b:4,3-b']dithiophene)titanium dichloride;
methylene-1-(3-isopropyl-indenyl)-7-(2,5-dimethylcyclopentadienyl-[1,2-b:4,3-b']dithiophene)titanium dichloride;
methylene-1-(2-methyl-indenyl)-7-(2,5-dimethylcyclopentadienyl-[1,2-b:4,3-b']dithiophene)titanium dichloride;
methylene-1-(tetrahydroindenyl)-7-(2,5-dimethylcyclopentadienyl-[1,2-b:4,3-b']dithiophene)titanium dichloride;
methylene(2,4-dimethylcyclopentadienyl)-7-(2,5-dimethylcyclopentadienyl-[1,2-b:4,3-b']dioxazol)titanium dichloride;
methylene(2,3,5-trimethyl-cyclopentadienyl)-7-(2,5-dimethylcyclopentadienyl-[1,2-b:4,3-b']dioxazol)titanium dichloride;
methylene-1-(indenyl)-7-(2,5-dimethylcyclopentadienyl-[1,2-b:4,3-b']dioxazol)titanium dichloride;
isopropylidene(3-methyl-cyclopentadienyl)-7-(2,5-dimethylcyclopentadienyl-[1,2-b:4,3-b']dithiophene)titanium dichloride;
isopropylidene(2,4-dimethyl-cyclopentadienyl)-7-(2,5-dimethylcyclopentadienyl-[1,2-b:4,3-b']dithiophene)titanium dichloride;
isopropylidene(2,4-diethyl-cyclopentadienyl)-7-(2,5-dimethylcyclopentadienyl-[1,2-b:4,3-b']dithiophene)titanium dichloride;
isopropylidene(2,3,5-trimethyl-cyclopentadienyl)-7-(2,5-dimethylcyclopentadienyl-[1,2-b:4,3-b']dithiophene)titanium dichloride;
isopropylidene-1-(indenyl)-7-(2,5-dimethylcyclopentadienyl-[1,2-b:4,3-b']dithiophene)titanium dichloride;
isopropylidene-1-(2-methyl-indenyl)-7-(2,5-dimethylcyclopentadienyl-[1,2-b:4,3-b']dithiophene)titanium dichloride;
dimethylsilandiyl-1-(2-methyl-indenyl)-7-(2,5-dimethylcyclopentadienyl-[1,2-b:4,3-b']dithiophene)titanium dichloride;
dimethylsilanediyl(3-tert-butyl-cyclopentadienyl)(9-fluorenyl)titanium dichloride,
dimethylsilanediyl(3-isopropyl-cyclopentadienyl)(9-fluorenyl)titanium dichloride,
dimethylsilanediyl(3-methyl-cyclopentadienyl)(9-fluorenyl)titanium dichloride,
dimethylsilanediyl(3-ethyl-cyclopentadienyl)(9-fluorenyl)titanium dichloride,
1-2-ethane(3-tert-butyl-cyclopentadienyl)(9-fluorenyl)titanium dichloride,
1-2-ethane (3-isopropyl-cyclopentadienyl)(9-fluorenyl)titanium dichloride,
1-2-ethane (3-methyl-cyclopentadienyl)(9-fluorenyl)titanium dichloride,
1-2-ethane (3-ethyl-cyclopentadienyl)(9-fluorenyl)titanium dichloride, dimethylsilandiylbis-6-(3-methylcyclopentadienyl-[1,2-b]-thiophene) dichloride;
dimethylsilandiylbis-6-(4-methylcyclopentadienyl-[1,2-b]-thiophene)titanium dichloride;
dimethylsilandiylbis-6-(4-isopropylcyclopentadienyl-[1,2-b]-thiophene)titanium dichloride;
dimethylsilandiylbis-6-(4-ter-butylcyclopentadienyl-[1,2-b]-thiophene)titanium dichloride;
dimethylsilandiylbis-6-(3-isopropylcyclopentadienyl-[1,2-b]-thiophene)titanium dichloride;
dimethylsilandiylbis-6-(3-phenylcyclopentadienyl-[1,2-b]-thiophene)titanium dichloride;

dimethylsilandiylbis-6-(2,5-methyl-3-phenylcyclopentadienyl-[1,2-b]-thiophene)titanium dichloride;
dimethylsilandiylbis-6-[2,5-dimethyl-3-(2-methylphenyl)cyclopentadienyl-[1,2-b]-thiophene]titanium dichloride;
dimethylsilandiylbis-6-[2,5-dimethyl-3-(2,4,6-trimethylphenyl)cyclopentadienyl-[1,2-b]-thiophene]titanium dichloride;
dimethylsilandiylbis-6-[2,5-dimethyl-3-mesitylenecyclopentadienyl-[1,2-b]-thiophene]titanium dichloride;
dimethylsilandiylbis-6-(2,4,5-trimethyl-3-phenylcyclopentadienyl-[1,2-b]-thiophene)titanium dichloride;
dimethylsilandiylbis-6-(2,5-diethyl-3-phenylcyclopentadienyl-[1,2-b]-thiophene)titanium dichloride;
dimethylsilandiylbis-6-(2,5-diisopropyl-3-phenylcyclopentadienyl-[1,2-b]-thiophene)titanium dichloride;
dimethylsilandiylbis-6-(2,5-diter-butyl-3-phenylcyclopentadienyl-[1,2-b]-thiophene)titanium dichloride;
dimethylsilandiyibis-6-(2,5-ditrimethylsilyl-3-phenylcyclopentadienyl-[1,2-b]-thiophene)titanium dichloride;
dimethylsilandiylbis-6-(3-methylcyclopentadienyl-[1,2-b]-silole)titanium dichloride;
dimethylsilandiylbis-6-(3-isopropylcyclopentadienyl-[1,2-b]silole)titanium dichloride;
dimethylsilandiylbis-6-(3-phenylcyclopentadienyl-[1,2-b]-silole)titanium dichloride;
dimethylsilandiylbis-6-(2,5-dichloride-3-phenylcyclopentadienyl-[1,2-b]-silole)titanium dichloride;
dimethylsilandiylbis-6-[2,5-dichloride-3-(2-methylphenyl)cyclopentadienyl-[1,2b]-silole]titanium dichloride;
dimethylsilandiylbis-6-[2,5-dichloride-3-(2,4,6-trimethylphenyl)cyclopentadienyl-[1,2-b]-silole]titanium dichloride;
dimethylsilandiylbis-6-[2,5-dichloride-3-mesitylenecyclopentadienyl-[1,2-b]-silole]titanium dichloride;
dimethylsilandiylbis-6-(2,4,5-trimethyl-3-phenylcyclopentadienyl-[1,2-b]-silole)titanium dichloride;
[dimethylsilyl(tert-butylamido)][(N-methyl-1,2-dihydrocyclopenta[2,1-b]indol-2-yl)]titanium dichloride;
[dimethylsilyl(tert-butylamido)][(6-methyl-N-methyl-1,2-dihydrocyclopenta[2, -b]indol-2-yl)]titanium dichloride;
[dimethylsilyl(tert-butylamido)][(6-methoxy-N-methyl-1,2-dihydrocyclopenta[2,1-b]indol-2-yl)]titanium dichloride;
[dimethylsilyl(tert-butylamido)][(N-ethyl-1,2-dihydrocyclopenta[2,1-b]indol-2-yl)]titanium dichloride;
[dimethylsilyl(tert-butylamido)][N-phenyl-1,2-dihydrocyclopenta[2,1-b]indol-2-yl)]titanium dichloride;
[dimethylsilyl(tert-butylamido)][(6-methyl-N-phenyl-1,2-dihydrocyclopenta[2,1-b]indol-2-yl)]titanium dichloride;
[dimethylsilyl(tert-butylamido)][(6-methoxy-N-phenyl-1,2-dihydrocyclopenta[2,1-b]indol-2-yl)]titanium dichloride;
[dimethylsilyl(tert-butylamido)][(N-methyl-3,4-dichloride-1,2-dihydrocyclopenta[2,1-b]indol-2-yl)]titanium dichloride;
[dimethylsilyl(tert-butylamido)][(N-ethyl-3,4-dichloride-1,2-dihydrocyclopenta[2,1-b]indol-2-yl)]titanium dichloride;
[dimethylsilyl(tert-butylamido)][(N-3-phenyl-3,4-dichloride-1,2-dihydroclopenta[2,1-b]indol-2-yl)]titanium dichloride;

as well as the corresponding dimethyl, hydrochloro and dihydro compounds.

Suitable metallocene complexes belonging to formulas (II), (III) (IV) and (V) are described in WO 98/22486, WO 99/58539 WO 99/24446, U.S. Pat. No. 5,556,928, WO 96/22995, EP-A-485 822, EP-A485 820, U.S. Pat. No. 5,324, 800, EP-A-129 368, U.S. Pat. No. 5,145,819, EP-A485 823, WO 01/47939, WO 01/44318, PCT/EP02/13552, EP-A416 815, EP-A420 436, EP-A-671 404, EP-A-643 066 and WO 91/04257.

The partially dealcoholated adduct of formula $MgT_2 \cdot wR'OH$ used in step a) can be obtained by partial dealcoholation of adducts of $MgT_2$ with alcohols, said adducts containing from 1 to 6 mol of alcohol. It is possible that two adducts having the same content of alcohol, i.e. having the same brute formula, be different in porosity and surface area for the reason that one adduct is partially dealcoholated.

The dealcoholation can be carried out according to known methodologies such as those described in EP-A-395 083. Depending on the extent of the dealcoholation treatment, partially dealcoholated adducts can be obtained having an alcohol content generally ranging from 0.1 to 3 moles of alcohol per mole of $MgT_2$, preferably from 2.9 to 0.5; more preferably from 2.9 to 1.

Said partially dehalcoholated magnesium adduct is then contacted with an organo-aluminium compound of formula $H_cAlU_{3-e}$ or $H_eAl_2U_{6-e}$ in an inert solvent by using methods common known in the art, such as the method described in EP-A-553 806.

In step b) of the process of the present invention the titanocene compound can be supported on the carrier obtained in step a) according to known methods by bringing the product of step a) into contact, for example, with a solution of the titanocene compound, operating at temperatures between room temperature and 120° C. The metallocene compound that is not fixed on the support is removed by filtration or similar methods.

The amount of titanocene compound supported on the adduct of formula (I) is generally between 1000 µmol/g of support and 1 µmol/g of support; preferably said amount ranges from 500 µmol/g of support to 2 µmol/g of support; more preferably from 200 µmol/g of support to 2 µmol/g of support.

The catalyst system object of the present invention can be used for (co)polymerizing one or more olefins. Therefore a further object of the present invention is a process for (co) polymerizing olefins containing from 2 to 20 carbon atoms comprising contacting one or more of said olefins under polymerization conditions in the presence of the catalyst system described above. Preferably alpha-olefins containing from 2 to 20 carbon atoms are used.

Examples of alpha-olefins that can be used with the process of the present invention are: ethylene, propylene, 1-butene, 1-pentene, 4-methyl-1-pentene, 1-hexene, 1-octene, 4,6-dimethyl-1-heptene, 1-decene, 1-dodecene, 1-tetradecene, 1-hexadecene, 1-octadecene and 1-eicosene. Preferred olefins are propylene, ethylene 1-butene, 1-hexene and 1-octene.

The following examples are given for illustrative purpose and do not intend to limit the invention.

Materials and General Procedures

All manipulations were performed under an argon atmosphere using a glove box (Braun MB-150 GI or LM-130) and Schlenk techniques. Solvents were distilled from Na (toluene) or Na/benzophenone (heptane) and freeze-thaw degassed twice before use. $Cp_2TiCl_2$ and $Cp_2ZrCl_2$ were purchased from Aldrich and recrystallised from toluene and dichloromethane respectively prior to use.

rac-Ethylenebis(indenyl)zirconium dichloride ($Et[Ind]_2ZrCl_2$) was prepared according to F. R. W. P. Wild, L. Zsolnai, G. Huttner, H. H. Brintzinger, *J. Organomet Chem.* 1982, 232, 233.

$Me_2Si(Me_4Cp)(N'Bu)TiCl_2$ was prepared according to EP 416815.

Cp[1,3-(2',6'-Me$_2$C$_6$H$_3$)$_2$(CH$_2$N)$_2$C=N]TiCl$_2$ was prepared according to WO 02/070569. ($^t$BU$_3$P=N)CpTiCl$_2$ was prepared according to D. W. Stephan, J. C. Stewart, F. Guérin, S. Courtenay, J. Kickham, E. Hollink, C. Beddie, A. Hoskin, T. Graham, P. Wei, R. E. v. H. Spence, W. Xu, L. Koch, X. Gao, D. G. Harrison, *Organometallics*, 2003, 22, 1937.

CpTiCl$_3$ was prepared according to A. N. Cardoso, R. J. H. Clark, S. Moorhouse, *J. Chem. Soc., Dalton Trans*, 1980, 7, 1156.

($^t$BuCp)TiCl$_3$ was prepared according to K. Nomura, N. Naga, M. Miki, K. Yanagi, *Macromolecules*, 1998, 33, 7588.

(C$_5$H$_4$CMe$_2$Ph)TiCl$_3$ was prepared according to J. Saβ-mannshausen, A. K. Powell, C. E. Anson, S. Wocadlo, M. Bochmann, *J. Organometal Chem.* 1999, 592, 84.

AlEt$_3$ (25 wt. % solution in toluene) and AlEt$_2$Cl (25 wt. % solution in toluene) were obtained from Aldrich, whilst Al$^i$Bu$_3$ (1M solution in hexane) was purchased from Fluka. Ethylene (3.5 grade supplied by Air Liquide) was purified by passing over columns of 4 Å Molecular Sieves and BTS copper catalyst.

The Al and transition metal contents were determined by atomic absorption.

Surface area (BET) is determined according to BET methods (apparatus used: SORPTOMATIC 1800 from Carlo Erba).

The ethoxide content in the magnesium adducts was determined by GC analysis of the ethanol content of a solution obtained by dissolving 100 mg support in 5 mL n-BuOH containing a known quantity of n-PrOH as internal standard.

Preparation of Partially Dealcoholated Adduct of Formula MgCl$_2$.wROH

The adduct MgCl$_2$.3EtOH was prepared according to the procedure described in Example 2 of U.S. Pat. No. 4,399,054, operating at 3000 rpm instead of at 10000 rpm.

The adduct was partially dealcoholated by heating in a stream of nitrogen at temperatures increasing from 30° C. to 180° C., until an adduct containing the amount of ethyl alcohol reported in table 1 was obtained.

Preparation of the Catalyst System, General Procedure

Step a) Preparation of the Support MgCl$_2$/AlR$_j$(OEt)$_{3-j}$

Typically, 10 mL n-heptane were added to 1 g of a adduct of magnesium chloride and ethanol prepared according to the procedure reported above under argon and the mixture was cooled to 0° C. A 25 wt-% solution in the solvent indicated in table 1 of the organo aluminium compound reported in table 1 was then added gradually, over 5-10 min. in a mol ratio Al/EtOH reported in table 1. The reaction being carried out in a standard Schlenk vessel equipped with a pressure release valve. After standing overnight at room temperature, the mixture was filtered and the solid washed twice with 10 mL heptane.

Step b) Reaction with the Metallocene Compound

A solution of the metallocene compound reported in table 2 in toluene (4 mL) was added to 200 mg of support prepared in step a). The mixture was heated to 60° C. and kept at this temperature for 1 h. In the case of Cp$_2$TiCl$_2$, a dark green solid was obtained, the liquid phase having become colourless. The liquid phase was removed by decantation and the solid phase was washed with heptane (2 mL) and dried under a flow of argon at 60° C.

Preparation of the Catalyst System, Comparative Examples I General Procedure

Step a) Preparation of the Support MgCl$_2$/AlR$_n$(OEt)$_{3-n}$

The same procedure followed for the above step a) was used.

step b) Reaction with Metallocene Compound

A solution of the metallocene compound reported in table 2 (20 μmol) in toluene (4 mL) was mixed with triisobutyla-luminum (TIBAL) (100 μmol) to give a violet solution. After 1 h at room temperature, this solution was added to 200 mg of support prepared in step a) as indicated in table 1. The mixture was heated to 60° C. and kept at this temperature for 1 h, after which time a light green solid was obtained. In contrast to the experiments carried out without the catalyst/TIBAL precontact, the liquid phase was not colourless but remained violet. The liquid phase was removed by decantation and the solid phase was washed with heptane (2 mL) and dried under a flow of argon at 60° C.

Preparation of the Catalyst System, Comparative Examples II General Procedure

Preparation of Non Dealcoholated Adduct of Formula MgCl$_2$.2.37EtOH

Following the procedure described by Lee et al, in J. Molec. Catal. A 191, 2003, 155, magnesium chloride (9.52 g) was mixed with ethanol (100 mL) and stirred at 60° C. until dissolved. n-Decane (100 at) was then added and the mixture stirred at (nominally) 2000 rpm under vacuum at 80° C. As described by Lee, precipitation was observed as the ethanol evaporated. The solid product was separated by decantation and washed first with toluene (50 mL) and subsequently petroleum ether (40-70 fraction; 2×20 mL), then dried under vacuum (1 mbar) for 20 min. to give a fine, free-flowing powder. Determination of the ethanol content of the product, using a GC method, described above indicated the compositions MgCl$_2$.2.37EtOH.

Step a) Preparation of the Support MgCl$_2$/AlEt$_n$(OEt)$_{3-n}$ 10 mL n-heptane were added to 1 g of the MgCl$_2$.2.37EtOH support obtained as described above under argon and the mixture was cooled to 0° C. AlEt$_3$ (25 wt-% solution in toluene) was then added gradually, over 5-10 min., to give a mol ratio AlEt$_3$/EtOH=2, the reaction being carried out in a standard Schlenk vessel equipped with a pressure release valve. The mixture was allowed to warm slowly to room temperature and reaction was continued with occasional agitation for a further 2 days. The resulting support was isolated by filtration, washed with heptane and petroleum ether (40-70) and then dried under a flow of argon and subsequently in vacuum.

Step b) Reaction with Metallocene Compound

A bright red solution of Cp$_2$TiCl$_2$ (20 μmol) in toluene (4 mL) was added to 200 mg of the above MgCl$_2$/Et$_n$Al(OEt)$_{3-n}$, support and the mixture heated to 60° C. and kept at this temperature for 1 h, after which time a green solid was obtained, the liquid phase having become colorless. The liquid phase was removed by decantation and the solid was dried under a flow of argon at 60° C. The green color of the immobilized catalyst was less intense than observed in the examples given in table 2.

Step b) Reaction with Metallocene Compound Previously Treated with TIBAL (Al$^i$Bu$_3$)

A bright red solution of Cp$_2$TiCl$_2$ (20 μmol) in toluene (4 mL) was mixed with Al$^i$Bu$_3$ (100 μmol), resulting in an immediate change of color to give a violet solution. After 1 h at room temperature, this solution was added to 200 mg of the above MgCl$_2$/Et$_n$Al(OEt)$_{3-n}$ support and the mixture heated to 60° C. and kept at this temperature for 1 h, after which time a light green solid was obtained. In contrast to the experiment carried out without the catalyst/Al$^i$Bu$_3$ precontact the liquid phase was not colorless but remained violet. After removal of the liquid phase by decantation and washing with heptane (2 mL) the solid was dried under a flow of argon at 60° C. The results of the polymerization runs are reported in table 3.

Polymerization, General Procedures

Polymerization runs 1-12 in table 2 were carried out in a 200 mL Büchi reactor equipped with a hollow-shaft turbine stirrer. 100 mg of immobilized catalyst was charged to the reactor, followed by 100 mL of heptane containing 1 mmol triisobutylaluminum (TIBAL). The reactor contents were heated in 5 min. to 50° C. at an ethylene overpressure pressure of 0.1 MPa, after which the monomer pressure was increased to 0.5 MPa and kept constant for 45 min. The stirrer rate was approx. 1200 rpm. After venting the reactor, the polymer slurry was mixed with 20 mL ethanol containing 9% HCl, followed by 200 mL 1M $HCl_{aq}$, and stirred for 20 min. The polymer was recovered by filtration, washed with water (3×200 mL) and ethanol (2×30 mL) and dried in vacuum overnight at 70° C.

All other polymerization runs in tables 2 and 3 were carried out in a 1 L Premex autoclave equipped with a Vortex stirrer. Petroleum ether (40-70, 450 mL) was introduced via a canulla. The reactor contents were stirred and heated to 50° C. Triisobutylaluminium (TIBAL, 1 mmol) in petroleum ether (40-70, 10 mL) was introduced via the catalyst injection system. An ethylene overpressure of 0.1 MPa was applied and stirring continued for 5-10 min. A slurry of the immobilized catalyst (100 mg) in petroleum ether (40-70, 10 mL) was introduced through the catalyst injection system, which was then flushed with a further 50 mL petroleum ether (40-70). The ethylene pressure was increased to 1 MPa and kept constant for 2 h at a polymerization temperature of 50° C., the stirrer speed being ca. 1000 rpm. Polymerization was terminated by injection of 20 mL methanol. After venting the reactor, the polymer was isolated as described above.

The polymerization results are reported in tables 2 and 3.

Molecular weights and molecular weight distributions of the resulting polymers were determined by high temperature GPC (PL-GPC210) at 135° C. using 1,2,4-trichlorobenzene as solvent.

TABLE 1

| Support | Starting material | organo-aluminium compound | solvent | Al/EtOH molar ratio |
|---|---|---|---|---|
| A | $MgCl_2 \cdot 1.1$ EtOH | $AlEt_3$ | toluene | 2 |
| B | $MgCl_2 \cdot 1.1$ EtOH | $Al^iBu_3$ | hexane | 2 |
| C | $MgCl_2 \cdot 2.1$ EtOH | $AlEt_3$ | toluene | 2 |
| D | $MgCl_2 \cdot 2.1$ EtOH | $Al^iBu_3$ | hexane | 2 |
| E | $MgCl_2 \cdot 2.1$ EtOH | $AlEt_2Cl$ | toluene | 3 |
| F | $MgCl_2 \cdot 2.8$ EtOH | $AlEt_3$ | toluene | 2 |
| G | $MgCl_2 \cdot 2.8$ EtOH | $Al^iBu_3$ | hexane | 2 |
| H* | $MgCl_2 \cdot 2.37$ EtOH | $AlEt_3$ | toluene | 2 |

*comparative (non dehalcolated)

| Support | Al, wt-% | OEt, wt-% | Overal composition | Surface area |
|---|---|---|---|---|
| A | 4.10 | 4.9 | $MgCl_2 \cdot 0.18AlEt_{2.28}(OEt)_{0.72}$ | 39 $m^2/g$ |
| B | 2.81 | 3.1 | $MgCl_2 \cdot 0.12Al^iBu_{2.34}(OEt)_{0.66}$ | n.a. |
| C | 4,80 | 5.6 | $MgCl_2 \cdot 0.22AlEt_{2.31}(OEt)_{0.69}$ | 373 $m^2/g$ |
| D | 2.92 | 3.8 | $MgCl_2 \cdot 0.13Al^iBu_{2.22}(OEt)_{0.78}$ | n.a. |
| E | 6.83 | 7.8 | $MgCl_2 \cdot 0.36AlEt_{1.31}Cl(OEt)_{0.69}$ | n.a. |
| F | 5.98 | 6.5 | $MgCl_2 \cdot 0.29AlEt_{2.35}(OEt)_{0.65}$ | n.a. |
| G | 4.14 | 4.6 | $MgCl_2 \cdot 0.21Al^iBu_{2.33}(OEt)_{0.67}$ | n.a. |
| H* | n.a. | n.a. | n.a. | n.a. |

*comparative (non dehalcolated magnesium alcohol adduct)
n.a. not available

TABLE 2

| Run | Support | titanocene | loading on support μmol/g | Activity kg/mol · bar · h | $M_w$ | $M_w/M_n$ |
|---|---|---|---|---|---|---|
| 1 | A | $Cp_2TiCl_2$ | 100 | 218 | 1181500 | 2.6 |
| 2 | B | $Cp_2TiCl_2$ | 100 | 207 | 728600 | 2.5 |
| 3 | C | $Cp_2TiCl_2$ | 100 | 327 | 1106000 | 2.7 |
| 4 | C | $Cp_2TiCl_2$ | 100 | 315 | n.a. | n.a. |
| 5 | C | $Cp_2TiCl_2$ | 100 | 320 | n.a. | n.a. |
| 6 | C | $Me_2Si(Me_4Cp)(N^tBu)TiCl_2$ | 100 | 217 | 1113500 | 2.5 |
| 7 | D | $Cp_2TiCl_2$ | 100 | 268 | 1038500 | 2.0 |
| 8 | E | $Cp_2TiCl_2$ | 100 | 50 | 440300 | 2.1 |
| 9 | F | $Cp_2TiCl_2$ | 100 | 85 | 1000400 | 2.8 |
| 10 | G | $Cp_2TiCl_2$ | 100 | 89 | 963600 | 2.6 |
| 11 | C | $Cp_2ZrCl_2$ | 100 | 114 | 734700 | 2.4 |
| 12 | C | $rac\text{-}Et(Ind)_2ZrCl_2$ | 100 | 5 | 645400 | 2.1 |
| 13 | C | $Cp_2TiCl_2$ | 50 | 343 | n.a. | n.a. |
| 14 | C | $Cp_2TiCl_2$ | 25 | 432 | n.a. | n.a. |
| 15 | C | $Cp_2TiCl_2$ | 10 | 627 | n.a. | n.a. |
| 16 | C | $Cp[1,3\text{-}(2',6'\text{-}Me_2C_6H_3)_2(CH_2N)_2C=N]TiCl_2$ | 100 | 201 | n.a. | n.a. |
| 17 | C | $Cp[1,3\text{-}(2',6'\text{-}Me_2C_6H_3)_2(CH_2N)_2C=N]TiCl_2$ | 5 | 1834 | n.a. | n.a. |
| 18 | C | $Me_2Si(Me_4Cp)(N^tBu)TiCl_2$ | 5 | 465 | n.a. | n.a. |
| 19 | C | $(^tBu_3P=N)CpTiCl_2$ | 5 | 1230 | n.a. | n.a. |
| 20 | A | $Cp_2TiCl_2$ | 10 | 606* | 619400 | 2.3 |
| 21 | A | $CpTiCl_3$ | 10 | 7510* | 1081500 | 2.2 |
| 22 | A | $(^tBuCp)TiCl_3$ | 10 | 7520* | 865400 | 2.4 |
| 23 | A | $(C_5H_4CMe_2Ph)TiCl_3$ | 10 | 7940* | 503300 | 2.5 |

*polymerization time 1 hour
n.a. not available

TABLE 3 comparative examples

| Run | Support | Titanocene | loading on support μmol/g | Activity kg/mol · bar · h |
|---|---|---|---|---|
| 3 | C | $Cp_2TiCl_2$ | 100 | 327 |
| 24§ | C | $Cp_2TiCl_2^+$ | 100 | 91 |
| 6 | C | $Me_2Si(Me_4Cp)(N^tBu)TiCl_2$ | 100 | 217 |
| 25§ | C | $Me_2Si(Me_4Cp)(N^tBu)TiCl_2^+$ | 100 | 183 |
| 16 | C | $Cp[1,3\text{-}(2',6'\text{-}Me_2C_6H_3)_2(CH_2N)_2C=N]TiCl_2$ | 100 | 201 |
| 26§ | C | $Cp[1,3\text{-}(2',6'\text{-}Me_2C_6H_3)_2(CH_2N)_2C=N]TiCl_2^+$ | 100 | 47 |

TABLE 3-continued comparative examples

| Run | Support | Titanocene | loading on support μmol/g | Activity kg/ mol · bar · h |
|---|---|---|---|---|
| 27[§] | C | rac-Et(Ind)$_2$ZrCl$_2$ | 100 | 8 |
| 28[§] | C | rac-Et(Ind)$_2$ZrCl$_2$[+] | 100 | 20 |
| 29[§] | H | Cp$_2$TiCl$_2$ | 100 | 262 |
| 30[§] | H | Cp$_2$TiCl$_2$[+] | 100 | 25 |

[+]precontacted with TIBA
[§]comparative example

From the above table clearly results that the polymerization activity of the titanium-based catalyst system obtained according to the process of the present invention is higher than the activity of a similar catalyst system wherein the titanocene is pretreated with an organoaluminum compound such as TIBA. From the above table also results that this effect is achieved only when a titanium-based catalyst system is used, while for the zirconium-based catalyst the improvement of the activity due to the avoidance of the pretreatment with TIBA is not present (see entries 27 and 28). Moreover when a non dealcholated magnesium chloride is used the activity of the titanocene-based catalyst results to be lower (see entries 29 and 30 in which the support H is used).

What is claimed is:

1. A catalyst system obtained by a process comprising: contacting:
    (i) a support of a partially dealcoholated adduct of formula MgT$_2$wR'OH, wherein T is chlorine, bromine, or iodine;
    R' is a linear or branched $C_1$-$C_{10}$ alkyl radical; and
    w is a non-integer number ranging from 3 to 0.1;
    with
    (ii) an organo-aluminium compound of formula $H_eAlU_{3-e}$ or $H_eAl_2U_{6-e}$, wherein
        U, same or different, are hydrogen, halogen, or hydrocarbon radicals comprising from 1 to 20 carbon atoms, and optionally comprise at least one silicon or germanium atom; with the proviso that at least one U is different from halogen; and
    e is a non-integer number ranging from 0 to 1; to obtain an adduct of formula (I)

MgT$_2$·yAlQ$_j$(OR'')$_{3-j}$  (I)

wherein
    y ranges from 1.00 to 0.05;
    Q, same or different, are hydrocarbon radicals comprising from 1 to 20 carbon atoms, and optionally comprise at least one silicon or germanium atom; R'' is a linear or branched $C_1$-$C_{10}$ alkyl radical; and j is a non-integer number ranging from 0.01 to 3.00; and
    contacting the adduct of formula (I) with at least one metallocene compound comprising titanium as a central metal and at least one ligand comprising a cyclopentadienyl skeleton;
    with the proviso that the metallocene compound has not been previously treated with an organo-aluminium compound of formula $H_eAlU_{3-e}$ or $H_eAl_2U_{6-e}$, or an alumoxane.

2. The catalyst system according to claim 1, wherein T is chlorine; R' is a linear $C_1$-$C_{10}$ alkyl radical; and w is a non-integer number ranging from 3 to 0.5.

3. The catalyst system according to claim 1, wherein U is a linear or branched $C_1$-$C_{20}$-alkyl radical.

4. The catalyst system according to claim 1, wherein y ranges from 0.50 to 0.10; and j is a non-integer number ranging from 2.50 to 2.00.

5. The catalyst system according to claim 1, wherein the adduct of formula (I) has a surface area (BET) higher than 30 m$^2$/g.

6. The catalyst system according to claim 1, wherein the adduct of formula (I) comprises generally between 1000 μmol/g to 1 μmol/g of the metallocene compound, and the adduct of formula (I) supports the metallocene compound after the adduct of formula (I) is contacted with the metallocene compound.

7. The catalyst system according to claim 1, wherein the metallocene compound is a titanocene compound comprising at least one of formulas (II), (III), (IV) or (V):

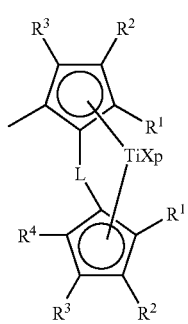

(II)

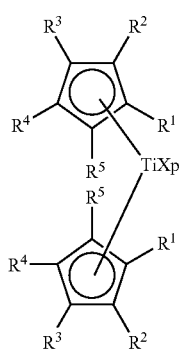

(III)

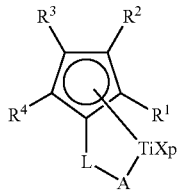

(IV)

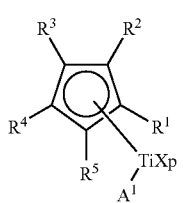

(V)

wherein
Ti is titanium;
X, same or different, are monoanionic sigma ligands selected from the group consisting of hydrogen, halogen, R6, OR6, OCOR6, SR6, NR62 and PR62, wherein $R^6$ is a hydrocarbon radical comprising from 1 to 20 carbon atoms, wherein $R^6$ optionally comprises one or more Si or Ge atoms;

p is an integer ranging from 1 to 2;

L is a divalent bridging group selected from a $C_1$-$C_{20}$ alkylidene, a $C_3$-$C_{20}$ cycloalkylidene, a $C_6$-$C_{20}$ arylidene, a $C_7$-$C_{20}$ alkylarylidene, or a $C_7$-$C_{20}$ arylalkylidene radical optionally comprising at least one heteroatom belonging to groups 13-17 of the Periodic Table of Elements, and a silylidene radical containing up to 5 silicon atoms; $R^1$, $R^2$, $R^3$, $R^4$ and $R^5$, same or different, are selected from hydrogen and $C_{10}$-$C_{40}$ hydrocarbon groups optionally comprising one or more heteroatoms belonging to groups 13-17 of the Periodic Table of Elements; or two adjacent $R^1$, $R^2$, $R^3$, $R^4$ and $R^5$ format least one 3-7 membered ring optional comprising one or more heteroatoms belonging to groups 13-17 of the Periodic Table of Elements;

$A^1$ is $NR^8$, 0, or S, wherein $R^8$ is a $C_1$-$C_{20}$ hydrocarbon group optionally comprising one or more heteroatoms belonging to groups 13-17 of the Periodic Table of Elements;

$A^1$ is hydrogen, halogen, $R^6$, $OR^6$, $OCOR^6$, $SR^6$, $NR^6_2$ and $PR^6_2$ or $NR^9$, wherein $R^6$ is a hydrocarbon radical comprising from 1 to 20 carbon atoms, wherein $R^6$ optionally comprises one or more Si or Ge atoms; and $R^9$ is a $C_1$-$C_{40}$ hydrocarbon group optionally comprising one or more heteroatoms belonging to groups 13-17 of the Periodic Table of Elements.

8. A process for (co)polymerizing at least one olefin comprising from 2 to 20 carbon atoms comprising contacting the at least one olefin under polymerization conditions in presence of the catalyst system of claim 1.

9. The process according to claim 8, wherein at least one alpha-olefin is (co)polymerized.

10. The process according to claim 9, wherein the alpha-olefin is selected from propylene, ethylene, 1-butene, 1-hexene, 1-octene, and combinations thereof.

* * * * *

UNITED STATES PATENT AND TRADEMARK OFFICE
CERTIFICATE OF CORRECTION

| | | |
|---|---|---|
| PATENT NO. | : 8,044,155 B2 | Page 1 of 1 |
| APPLICATION NO. | : 12/113601 | |
| DATED | : October 25, 2011 | |
| INVENTOR(S) | : Severn et al. | |

It is certified that error appears in the above-identified patent and that said Letters Patent is hereby corrected as shown below:

Title Pg, Item (30):
Under Foreign Application Priority Data, delete "February 24, 2004 (EP) 04075578".

Signed and Sealed this
Twenty-ninth Day of November, 2011

David J. Kappos
*Director of the United States Patent and Trademark Office*